United States Patent [19]
Preukschat et al.

[11] Patent Number: 4,986,393
[45] Date of Patent: Jan. 22, 1991

[54] ADJUSTABLE VIBRATION DAMPERS FOR MOTOR VEHICLES

[75] Inventors: Alfred Preukschat, Königswinter; Norbert Ackermann, Eitorf, both of Fed. Rep. of Germany

[73] Assignee: Boge AG, Eitorf, Fed. Rep. of Germany

[21] Appl. No.: 308,435

[22] Filed: Feb. 8, 1989

[30] Foreign Application Priority Data

Feb. 9, 1988 [DE] Fed. Rep. of Germany ....... 3803888

[51] Int. Cl.$^5$ ............................ F16F 9/46; F16F 5/00
[52] U.S. Cl. .................................... 188/299; 188/313; 188/318; 188/319
[58] Field of Search ............... 188/299, 311, 313, 314, 188/315, 318, 322.22, 280, 285, 319, 281, 282; 280/714, 707; 91/52; 92/8; 137/614.2; 251/129.15

[56] References Cited

U.S. PATENT DOCUMENTS

| | | | |
|---|---|---|---|
| 2,061,068 | 11/1936 | Fuchs | 188/299 |
| 3,877,347 | 4/1975 | Sheesley et al. | 188/313 X |
| 4,671,392 | 6/1987 | Woesner | 188/322.22 X |
| 4,723,640 | 2/1988 | Beck | 188/280 X |
| 4,802,561 | 2/1989 | Knecht et al. | 188/318 |

FOREIGN PATENT DOCUMENTS

| | | |
|---|---|---|
| 1242945 | 6/1967 | Fed. Rep. of Germany. |
| 3426014 | 2/1985 | Fed. Rep. of Germany. |
| 3711002 | 10/1988 | Fed. Rep. of Germany ......... 188/322.22 |
| 0458311 | 12/1936 | United Kingdom ................ 188/318 |

*Primary Examiner*—Robert J. Oberleitner
*Attorney, Agent, or Firm*—Nils H. Ljungman

[57] ABSTRACT

An adjustable vibration damper is for a motor vehicle or the like. The vibration damper includes a cylinder containing a damping medium. A piston is disposed within the cylinder for movement of the damping medium. A valve device is connected to the cylinder for flow of the damping medium therethrough. The valve device has at least a first damping element and a second damping element. The first damping element includes a first compression valve assembly and a first decompression valve assembly. The second damping element includes a second compression valve assembly and a second decompression valve assembly. The first compression valve assembly, the first decompression valve assembly, the second compression valve assembly, and the second decompression valve assembly have respective damping characteristics. There is included switching apparatus for selectively switching to at least one of the first and the second damping elements to select the respective damping characteristics thereof.

20 Claims, 7 Drawing Sheets

ADJUSTABLE VIBRATION DAMPERS FOR MOTOR VEHICLES

BACKGROUND OF THE INVENTION

1. Field of the Invention

This invention relates to an adjustable vibration damper for motor vehicles or the like and, more specifically, to such an adjustable vibration damper which includes a damping force control by a valve device which selectively utilizes different damping elements which are capable of decompression and compression damping.

2. Description of the Prior Art

The prior art includes hydraulic, adjustable vibration dampers, whose damping force in the decompression and/or compression stage can be modified during operation (e.g. German Patent Publication Published for Opposition Purposes No. 12 42 945). By means of these devices, the damping force characteristic of the vibration damper can be adjusted either manually or by the action of one of the vehicle mechanisms, to current operating conditions such as the speed of the vehicle. A disadvantage of such dampers of the prior art is that, because of the design, the speed of the adjustments is very low, so that the reaction to oscillations of the wheel suspensions is very sluggish.

The prior art also includes fast-acting fluid control devices for vehicle suspension systems (e.g. German Laid Open Patent Appln. No 34 26 014). The rapid switching action disclosed therein makes it possible to react to movements of the vibration damper by means of a damping force adjustment. The object of such vibration dampers is to stabilize the vehicle superstructure and thus to keep its movements as small as possible. For this purpose, the vibration damper is configured so that it is possible to measure the movements of the body superstructure and the wheel suspension and, under such movement conditions, to select a large damping force so that the direction of the damping force produced is opposite to the movement of the vehicle superstructure or to select a small damping force, if the damping force and vehicle superstructure movement are in the same direction. In order to achieve such an objective, it is necessary to adjust the damping force at the instant the vibration damper changes its direction of movement. Because of a phase shift between the desired damping force and the actual value achieved, the effectiveness of the damping method on which the system is based is seriously compromised. To reduce the phase shift between the desired value and the actual value during dynamic oscillations to a tolerable level, the damping force must be set rapidly. Given the characteristic frequencies of the wheel suspensions of approximately 10-15 Hertz (for automobiles), there is only about 2-10 milliseconds available to measure the movement of the vehicle superstructure, measure the relative wheel movement, process the signals, trip the switching process and execute the switching process. In actual practice, it is difficult to achieve such switching times.

A further disadvantage of this prior art system is that, in order to recognize the current movement status, not only are measurement sensors for the movement of the vehicle necessary, but also sensors for the movement of each individual wheel. On account of the need to measure several values, both the time required for signal processing and the costs for the entire system are significantly increased.

OBJECTS OF THE INVENTION

The object of the invention is to provide a valve device for a vibration damper for a motor vehicle or the like which is simple and economical to manufacture.

It is another another object to provide such a valve device which can be regulated so that a simple sensing of vehicle movement is possible.

It is a further object to provide such a valve device by which a low damping force can be produced when the damping force and the movement of the vehicle superstructure are in the same direction, and a high damping force can be produced when the damping force and the movement of the vehicle superstructure are in opposite directions.

SUMMARY OF THE INVENTION

To achieve these and other objects of the invention, a preferred embodiment thereof includes at least two damping elements, which can be switched either individually or jointly, and which each have a valve assembly for decompression damping and a valve assembly for compression damping, with different levels of damping characteristics for each. In both the decompression direction and the compression direction, the respective magnitudes or levels of the damping characteristics of the one damping element are opposite to those of the other damping element.

As a result of this arrangement, the valve device need no longer be set at the frequency of the damper oscillation, but only at the significantly lower frequency of the oscillation of the vehicle superstructure.

The preferred embodiment can be employed in overall systems which may be configured to include a number of advantages. For example, to guarantee the effectiveness of the damping method described above, it is possible that the only sensing necessary is that which is needed for a determination of the movement of the vehicle superstructure. Further, there may no longer be any need for signal transducers for the relative movement between the wheel suspension and vehicle superstructure. Additionally, the switching frequency of the adjustment device could be very significantly reduced. Still further, with a significant reduction of the switching frequency, the phase shift between the settings and the actual values achieved would no longer present a problem.

Another characteristic of the invention is that the one damping element produces a high damping force during decompression damping and a low damping force during compression damping and that the other damping element produces a low damping force during decompression damping and a high damping force during compression damping.

In one configuration of the invention, the damping elements are connected in parallel to one another, and in series with each damping element there is a switch or valve to selectively switch the pressure medium line. Alternatively, the damping elements can be connected parallel to one another, and in series with them is a switching apparatus in the form of a 3/2, 3/3 or ¾ multi-way valve which switches the pressure medium line.

The 3/2, 3/3 or ¾ multi-way valves may include one of several types of valves which are connected to three damping medium flow lines which are in turn connected to the damping elements in order to be able to selectively include or exclude them from the system. A 3/2 multi-way valve would have two positions in which would include one of the damping elements in the system while the other position would include the other damping element in the system. A 3/3 multi-way valve might include three positions for selectively including one of the damping elements, the other of the damping elements, or both of the damping elements, or alternatively, one of the damping elements, the other of the damping elements, or neither of the damping elements in the overall system. The ¾ multi-way valve might include four positions for selectively including one of the damping elements, the other of the damping elements, neither of the damping elements, or both of the damping elements.

In another important configuration, the damping elements are connected in series, and parallel to them are the switches in series which switch the pressure medium line, whereby the pressure medium line between the damping elements and the pressure medium line between the switches are connected to one another by means of another flow connection. The damping elements can also be connected in series, and in parallel to them, the switching device switching the pressure medium line can be installed in the form of a 3/2, 3/3 or ¾ multi-way valve, whereby the pressure medium line between the damping elements and the switching device located in the pressure medium line are connected to one another by means of an additional flow connection. The multi-way valves could be configured to selectively include one of the damping elements, the other of the damping elements, both of the damping elements in series, and/or both of the damping elements being by-passed.

In one configuration of the invention, the damping elements and the switches or switching device are located in a separate component outside the vibration damper, and are connected with the vibration damper by means of pressure medium lines. The vibration damper can also have a double piston with a damping element located in each piston.

To achieve a high damping setting or a low damping setting in the decompression and compression stage, another important characteristic of the invention provides an independent damping element which is upstream of the valve apparatus and connects the feed and discharge lines of the damping medium line with one another.

A preferred embodiment of the invention includes an adjustable vibration damper for a motor vehicle or the like. The vibration damper includes a cylinder containing a damping medium. A piston is disposed within the cylinder for movement of the damping medium. A valve device is connected to the cylinder for flow of the damping medium therethrough. The valve device has at least a first damping element and a second damping element. The first damping element includes a first compression valve assembly and a first decompression valve assembly. The second damping element includes a second compression valve assembly and a second decompression valve assembly. The first compression valve assembly, the first decompression valve assembly, the second compression valve assembly, and the second decompression valve assembly have respective damping characteristics. There is included switching apparatus for selectively switching to at least one of the first and the second damping elements to select the respective damping characteristics thereof.

DESCRIPTION OF THE PREFERRED EMBODIMENTS

Figure 5:
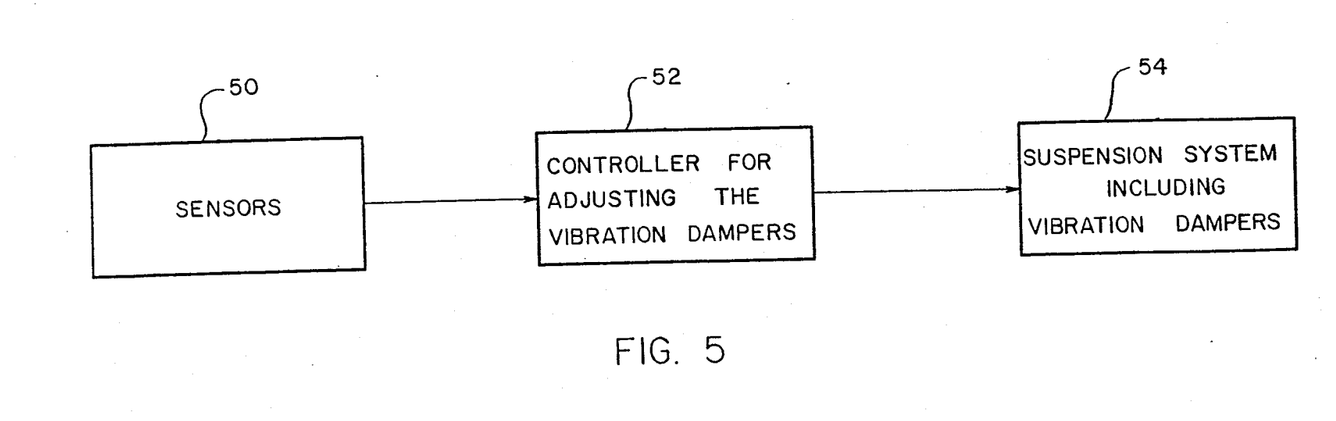
FIG. 5 is a block diagram of an overall system for adjusting the suspension of a motor vehicle or the like including sensors and the controller for adjusting vibration dampers by the use of the preferred valve devices.

As seen if FIG. 5, a block diagram is directed to an overall system for controlling the suspension of a motor vehicle or the like. Specifically, the system includes one or more sensors 50 for measuring the movements of the body superstructure and/or the wheel suspension of such a motor vehicle. Information from the Sensors 50 is provided to a Controller For Adjusting The Vibration Dampers 52. The vibration dampers, for example, may be of a type which are installed at various suspensions of the wheels of the vehicle. Finally, the Controller 52 would provide specific signals or commands to the Suspension System 54 for the specific adjustment of the damping force on the vibration dampers. The damping force would include both decompression and compression damping.

As mentioned above, the preferred vibration damper can be included in an overall suspension system which may require only sensing which is directed to the determination of the movement of the vehicle superstructure. For example, U.S. Pat. No. 4,719,800 is directed to an accelerometer and associated circuitry which may be used as a sensor for determining the movement of a vehicle superstructure. While the preferred adjustable vibration damper between each wheel suspension and the vehicle superstructure, it is possible that an alternative system for controlling the suspension of a motor vehicle or the like might include a controller therefor which could utilize such information. U.S. Pat. Nos. 4,577,509 and 4,638,670 disclose sensors which can be used for determining the distance traveled by a piston in a cylinder and can be mounted to determine the relative movement between the wheel suspension and a vehicle superstructure.

As will be seen, the preferred Controller For Adjusting Vibration Dampers 52 will include output signals for the control of the Suspension System 54. The preferred Suspension System 54 includes a number of solenoid-actuated valves in preferred and alternative valve devices for controlling the dampening force on adjustable vibration dampers. U.S. Pat. Nos. 4,749,069 and 4,749,070 disclose, by way of example, various control circuits for the operation of electromagnets in switches or valves for the selective control of vibration dampers.

Although the preferred invention includes a number of alternative means for providing adjustable vibration dampers with damping force being controlled through various preferred valve devices, a number of different types of adjustable shock absorbers or the like may be employed in the Suspension System 54 of a motor vehicle. For example, U.S. Pat. Nos. 4,650,042; 4,700,812; and 4,723,640 and German Pat. Appln. No. P 36 09 862.0 (which corresponds to U.S. Pat. No. 4,802,561) disclose specific structure related to various adjustable shock absorbers including damping valves and electromagnetic control valves for the operation thereof.

Figure 1A:
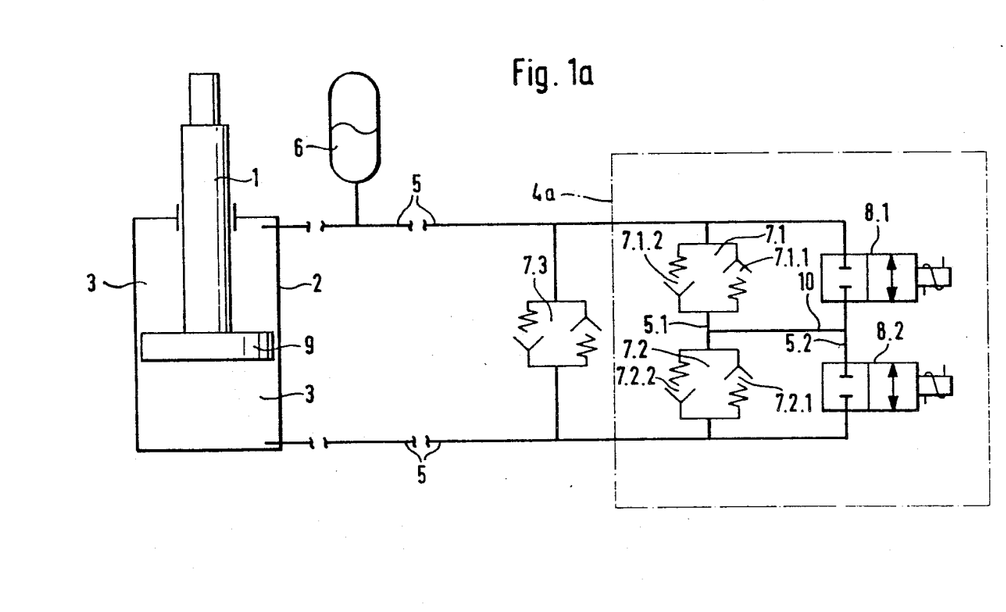
FIGS. 1a, 1b, 1c and 1d are schematic views of vibration dampers which are adjusted by different valve devices including various features of the invention.

FIG. 1a is a schematic view of a simplified vibration damper of a type which can be used for the suspension of a motor vehicle. The vibration damper includes a piston rod 1, a cylinder 2 and a piston 9 which divides the cylinder 2 into two work chambers 3. The upper and lower work chambers 3 which include a damping medium are connected by means of a pressure medium line 5 to the preferred valve device 4a. There is a reservoir 6 in the pressure medium line 5.

For the purposes of further discussion of the preferred and alternative embodiments of the invention as provided hereinbelow, movement of the damping medium by piston 9 into the cylinder 2 will produce compressive forces and resistance thereto while a movement of the piston rod tending to withdraw the piston 9 from the cylinder 2 will cause the damping medium to produce decompressive forces and resistance thereto. Clearly, those skilled in the suspension art will understand that various vibration dampers may be installed in either an upward or downward configuration depending on the particular motor vehicle or the suspension system thereof. For the purposes of explaining the present invention, however, it is sufficient to generally say that, for the embodiments generally discussed herein, the suspension system of the preferred invention would include adjustment features for producing greater forces in a compression stage than the forces created during a decompression stage.

As seen in FIG. 1, the preferred valve device 4a; comprises essentially the damping elements 7.1 and 7.2 as well as the switches or valves 8.1 and 8.2. The damping elements 7.1 and 7.2 can be selectively activated or deactivated by means of the switches or valves 8.1 and 8.2 according to the particular control signals received from the Controller For Adjusting The Vibration Dampers 52. The preferred damping element 7.1 has a soft valve assembly 7.1.1 for the decompression stage and a hard valve assembly 7.1.2 for the compression stage. The preferred damping element 7.2 has a hard valve assembly 7.2.1 for the decompression stage and a soft valve assembly 7.2.2 for the compression stage.

The preferred embodiment of FIG. 1 includes a damping element 7.3, which may be optional but, when included, is incorporated as a function of the design of the vibration damper. It will be clear to those skilled in the suspension art that such a damping element could be located or incorporated in the valve element itself, could be located outside the valve element or could be integrated into the piston (as shown for the piston 9 of FIG. 1c).

Generally, the preferred valve element 4a includes a series connection of the damping elements 7.1 and 7.2 as well as a series connection of the switches or valves 8.1 and 8.2. In this arrangement, there are flow connections 10, 5.1, 5.2 to make possible an optional activation of the damping element 7.1 or 7.2. Both switches or valves 8.1 and 8.2 are shown in a closed position in FIG. 1. It is common in the suspension art to include such a position, for example, when no signals are received from the Controller 52 in order for the valves to assume a preferred "fail safe" position. When both switches or valves 8.1 and 8.2 are closed, the damping medium would be capable of flowing through both damping elements 7.1 and 7.2. However, it should also be noted that the damping medium may alternatively flow through the damping element 7.3 if it is included and set accordingly.

If the switch or valve 8.2 is activated or shifted to the left of the position as seen in FIG. 1a, the damping element 7.2 and its associated valve assemblies 7.2.1 and 7.2.2 would be respectively utilized for the decompression and compression stages. Similarly, if the switch or valve 8.2 is activated instead of the switch or valve 8.1, the respective valve assemblies 7.1.1 and 7.1.2 of the damping element of the dampening element 7.1 would be utilized. If both of the switches or valves 8.1 and 8.2 were energized to shift to the left of the position as shown in FIG. 1a, the damping elements 7.1, 7.2 and 7.3 would effectively be inactivated by the fact that the damping medium would be capable of flowing through a by-pass line through the two switches or valves 8.1 and 8.2.

Figure 1B:
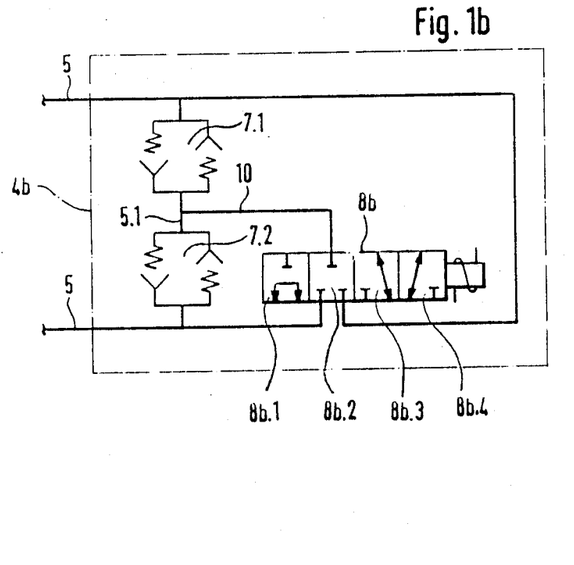

FIG. 1b is a schematic illustration of a valve device 4b, similar to that shown in FIG. 1a, in which the switches or valves 8.1 and 8.2 are eliminated as their functions are combined into a single switching device 8b. As seen in FIG. 1b, the switching device 8b is shown in a position 8b.2 to isolate the flow connections 10 and 5.1 and a by-pass line connecting the pressure medium lines 5. As a result, depending upon the particular settings of the dampening elements, the damping medium could flow through both of the damping elements 7.1 and 7.2 but could alternatively flow through a damping element 7.3. Controlled movement of the switching device 8b by the Controller 52, to a position 8b.1 would effectively bypass the damping elements 7.1, 7.2 and 7.3. Activation of the switching device 8b to position 8b.3 would activate the damping element 7.2 and its associated valve assemblies for the decompression and compression stage while movement of the switching device 8b by the Controller 52 to the 8b.4 position for activation of the damping element 7.1.

Figure 1C:
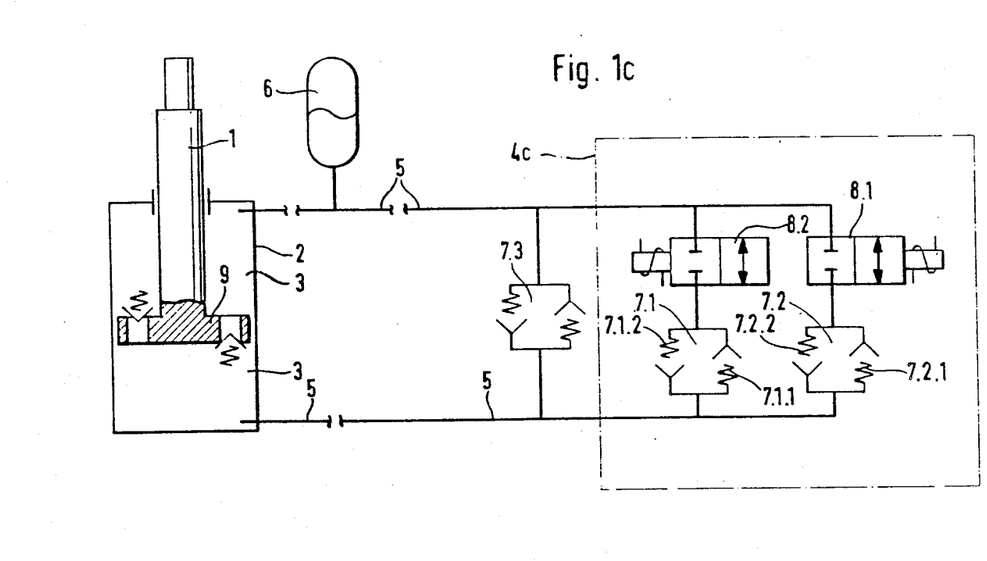

FIG. 1c shows a vibration damper which is, in principle, similar to that illustrated in FIG. 1a. The valve device 4c thereof also has damping elements 7.1 and 7.2 and switches or valves 8.1 and 8.2 but the elements and switches are arranged in a different manner. The switches or valves 8.1 and 8.2 and the damping elements 7.1 and 7.2 are connected to be parallel to one another. However, each damping element and a related switch are connected in series with one another. The switches or valves 8.1 and 8.2, in turn, can be opened and closed independently of one another. In the positions as shown in FIG. 1c, both the switches or valves 8.1 and 8.2 are in an inactive or closed position to isolate the damping elements 7.1 and 7.2 to effectively cause the damping medium to primarily flow through the damping element 7.3. It should be noted, as mentioned above, that the piston 9 includes integrated valve elements which would produce some damping effect. If switch 8.2 is shifted to an open position to allow flow through the damping element 7.1, the valve assemblies thereof would be primarily utilized for the decompression and the compression stages. Similarly, if the switch or valve 8.1 is shifted to the open position, the damping element 7.2 would be employed. With both of the switches or valves 8.1 and 8.2 shifted to an open position, the damping elements 7.1, 7.2 and 7.3 would all be capable of providing some dampening effect and the primary effect would depend on the particular setting of each.

Figure 1D:
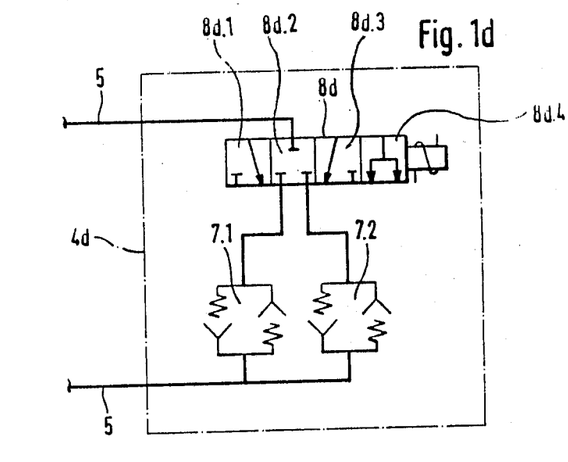

FIG. 1d is a schematic illustration of a valve device 4d, similar to that shown in FIG. 1c, in which the switches or valves 8.1 and 8.2 are eliminated as their functions are combined into a single switching device 8d. The switching device 8d is shown in a position 8d.2 in which both of the damping elements 7.1, 7.2 are inactivated to provide primary damping through the damping element 7.3. If the Controller 52 is utilized to switch the switching device 8d to the 8d.1 position, the damping element 7.2 will be primarily utilized. Switching to the position 8d.3 will cause the valve device 4d to provide primary damping at the damping element 7.1. If the switching device 8d is shifted to the 8d.4 position, the damping elements 7.1, 7.2 and 7.3 would again all be capable of providing damping depending on the particular setting of each.

In the discussion of all of the switches or valves 8.1, 8.2, 8b, and 8d, it should be recognized that each of these switches or valves is shown in a schematic form. In other words, the particular location of the various valve positions are only shown for illustrative purposes. An actual valve or switch may be configured in such a manner that shifting from one flow arrangement to another flow arrangement may or may not require actual shifting through one of the other valve positions as shown. In addition to the valve configurations disclosed in the various patents mentioned hereinabove, U.S. Pat. Nos. 4,340,202; 4,485,846; and 4,598,736 disclose four-way valves. It should be recognized that numerous four-way valves existing in the prior art could be utilized in the preferred embodiments of the invention. These and all of the other above-mentioned patents are incorporated herein by reference as if the entire contents thereof were fully set forth herein.

Figure 2A:
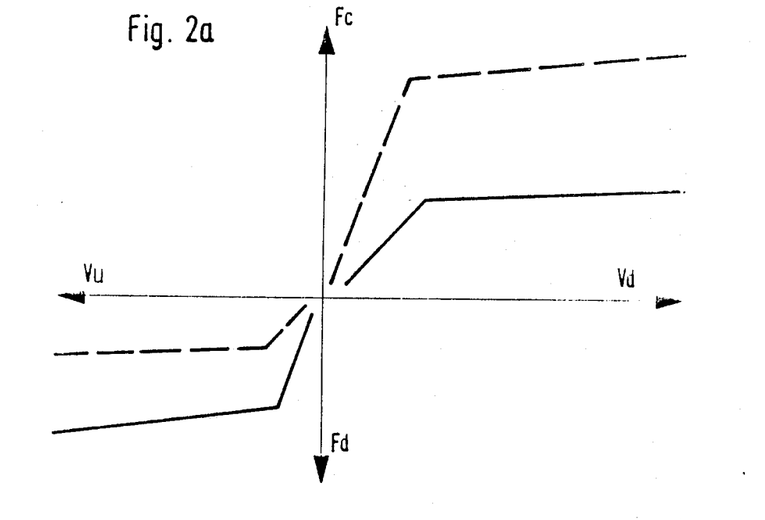
FIG. 2a is a force-velocity diagram illustrating the operation of a preferred vibration damper according to the invention.
Figure 2B:
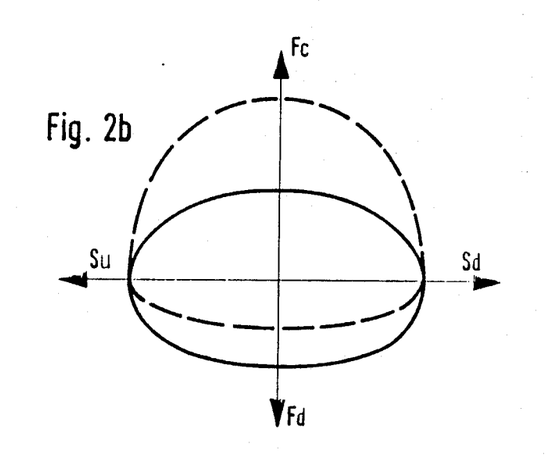
FIG. 2b is a force-distance diagram of a preferred vibration damper during its operation in accordance with the invention.

FIGS. 2a and 2b are respectively the force-velocity diagram and the force-distance diagram of a vibration damper with a valve device 4a similar to that illustrated in FIG. 1a. The force Fc represents the compressive forces while the force Fd represents the decompressive forces. Again, referring to FIG. 1a and the discussion provided hereinabove relating to the movement of the piston 9, it should be clear that the velocity Vd represents downward velocity of the piston 9 as shown, while the velocity Vu represents the upward velocity of the piston 9 as shown in FIG. 1a. Similarly, with regard to FIG. 2b, the distance Sd would represent the distance from the center position of the piston 9 in a downward direction while the distance Su would represent the distance from the center position of the piston 9 in an upward direction of FIG. 1a. The general skewing of each of the diagrams in FIGS. 2a and 2b results from the particular settings of the hard and soft valve assemblies thereof which are chosen in order to increase the damping effect, for example, during the compression stage relative to that of the decompression stage.

It should be clear from the diagrams that when the switch 8.1 is activated or opened, there is, as represented by the solid line, a relatively high decompression stage force Fd and a relatively low compression stage force Fc. When the other switch 8.2 is activated or opened, there is, as represented by the dotted line, a relatively low decompression stage force Fd and a relatively high compression stage force Fc. It should be clear that the particular switching of the switches or valves 8.1 and/or 8.2 is determined by the Controller 52 to selectively produce a different effect on the suspension system depending on the movement of the vehicle superstructure and its relative direction with respect to the vibration dampers of the overall suspension system. It should also be noted that there may be settings with high decompression and high compression stage forces, or low decompression and low compression stage forces, which are respectively possible, according to FIG. 1a, if both switches 8.1 and 8.2 are closed or if both switches 8.1 and 8.2 are open.

Figure 3:
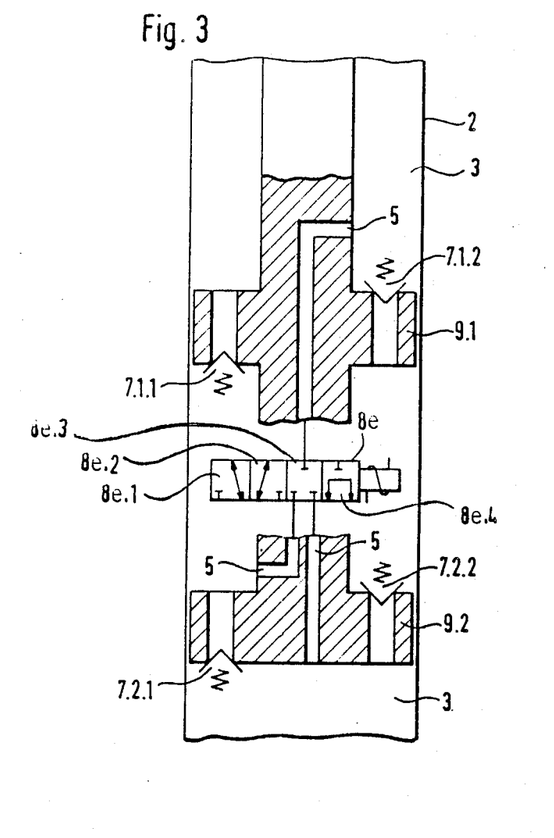
FIG. 3 is a schematic view of an alternative vibration damper having a double piston and a corresponding integrated valve device.

As seen in FIG. 3, an alternative vibration damper includes a cylinder 2 which houses a double piston, consisting of two individual pistons 9.1 and 9.2. The pistons 9.1 and 9.2 respectively include integrated damping elements 7.1 and 7.2 similar to those shown in FIGS. 1a and 1b. A switching device 8e, which generally corresponds to the switches 8.1 and 8.2 and/or the switch 8b, is located in the support shafting between the pistons 9.1 and 9.2. The space between the pistons 9.1 and 9.2 would be generally equivalent to the flow connections 10, 5.1 or 5.2. Again, it should be recognized that the switching device 8e is shown in a schematic form so that the relative location of the particular valve positions do not necessarily represent what would exist in an actual four-way valve.

As seen in FIG. 3, the switching device 8e is shown in the 8e.3 position with dampening element 7.1 and 7.2 being generally in series. When the switching device 8e is in the 8e.1 position, both of the damping elements 7.1 and 7.2 are generally bypassed. In the 8e.2 position, the damping element 7.2 is being utilized while in the 8e.4 position, the damping element 7.1 is being employed.

Figure 4A:
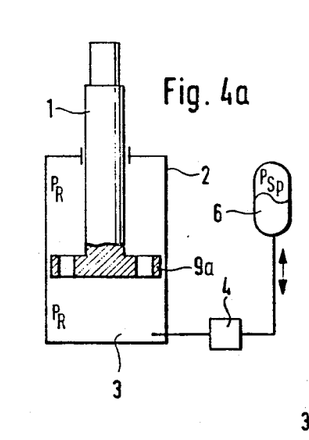
FIG. 4a is a schematic view of a level regulator which employs a preferred valve device of the invention.
Figure 4B:
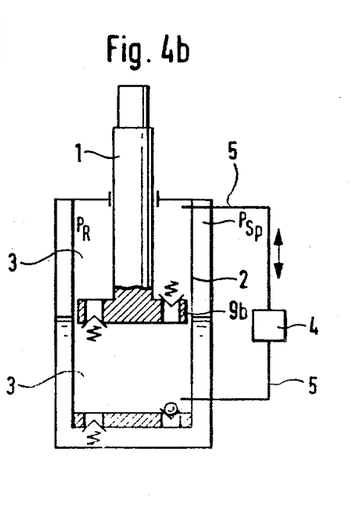
FIG. 4b is a schematic view of a telescoping tube vibration damper including a preferred valve device of the invention.
Figure 4C:
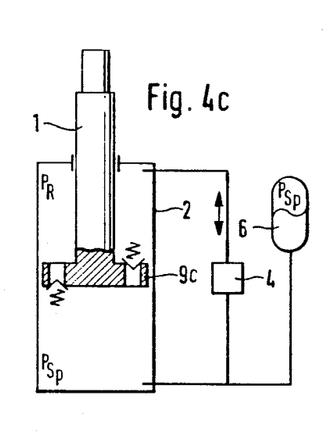
FIG. 4c is a schematic view of a gas-filled vibration damper which employs a preferred valve device of the invention.

FIGS. 4a to 4c are schematic illustrations which show possible connections of a valve device 4 to the work chambers 2 of the vibration damper and/or to the reservoir element 6 of various types of vibration dampers. The valve device 4 could be similar to any one of the valve devices 4a, 4b, 4c, or 4d discussed hereinabove. In the Figures, PR generally represents the pressure in the chamber while PSP generally represents the pressure in the reservoir.

FIG. 4a shows the compressor of a spring cylinder, which may be of a type conventionally used for level-controlled axles. The valve device 4 is located between the reservoir 6 and one of the work chambers 3. The piston 9a of the compressor is designed either without a throttle or with valve assemblies, as a function of the desired relationship between the damping characteristic and the switching of the damping elements 7.1 and 7.2 of the valve element 4.

FIG. 4b shows a telescoping tube vibration damper with an integrated reservoir. The valve device 4 is connected by the pressure medium lines 5 to the two work chambers 3 of the cylinder 2. The piston 9b can optionally be provided with valves or designed in a closed manner. However, with the closed model, a damping element 7.3 may be required in connection with the valve device 4 in a manner as illustrated in FIG. 1b.

FIG. 4c shows the installation of the valve device 4 in a gas-filled vibration damper. The piston 9c would be similar to that shown in FIG. 4b.

In summing up, one aspect of the invention resides broadly in an adjustable vibration damper with damping force control, in particular for motor vehicle, whereby there is at least one valve device with at least one damping element for decompression and compression damping, characterized by the fact that there are at least two damping elements 7 which can be switched either individually or jointly, and which have a valve assembly 7.1.1, 7.1.2, 7.2.1, 7.2.2 with different levels of damping characteristic for decompression and compression damping, whereby in both the decompression direction and compression direction, the level of the damping characteristic of the one damping element 7.1 is reciprocal to that of the other damping element 7.2.

Another aspect of the invention resides broadly in a vibration damper characterized by the fact that a damping element 7.2 produces a high damping force during decompression damping and a low damping force during compression damping, and that the other element 7.1 produces a low damping force during decompression damping and a high damping force during compression damping.

Yet another aspect of the invention resides broadly in a vibration damper characterized by the fact that the damping elements 7.1, 7.2 are connected parallel to one another, and in series with each damping element 7.1, 7.2 there is a switch 8.1, 8.2 which switches the pressure medium line 5.

A further aspect of the invention resides broadly in a vibration damper characterized by the fact that the damping elements 7.1, 7.2 are connected parallel to one another, and connected in series with them is a switching apparatus 8, designed as a 3/2, 3/3 or ¾ multi-way valve, which switches the pressure medium line 5.

A yet further aspect of the invention resides broadly in a vibration damper characterized by the fact that the damping elements 7.1, 7.2 are connected in series, and parallel to them, the switches 8.1, 8.2 switching the pressure medium line 5 are connected in series, whereby the pressure medium line 5.1 between the damping elements 7.1, 7.2 and the pressure medium line 5.2 between the switches 8.1, 8.2 are connected to one another by means of an additional flow connection 10.

Yet another further aspect of the invention resides broadly in a vibration damper characterized by the fact that the damping elements 7.1, 7.2 are connected in series, and parallel to them, the switching device 8 switching the pressure medium line 5 is connected in the form of a 3/2, 3/3 or ¾ multi-way valve, whereby the pressure medium line 5.1 between the damping elements 7.1, 7.2 and the switching device located in the pressure medium line 5 are connected to one another by means of an additional flow connection 10.

An additional aspect of the invention resides broadly in a vibration damper characterized by the fact that the damping elements 7.1, 7.2 and the switches 8.1, 8.2 or switching apparatus 8 are located in a separate component outside the vibration damper and are connected to the vibration damper by means of pressure medium lines 5.

A yet additional aspect of the invention resides broadly in a vibration damper characterized by the fact that the vibration damper has a double piston 9, whereby there is a damping element 7.1, 7.2 in each piston 9.1, 9.2.

A further additional aspect of the invention resides broadly in a vibration damper characterized by the fact that upstream of the valve apparatus 4 is an independent damping element 7.3, which connects the feed and discharge line of the damping medium line 5 with one another.

The invention as described hereinabove in the context of a preferred embodiment is not to be taken as limited to all of the provided details thereof, since modifications and variations thereof may be made without departing from the spirit and scope of the invention.

What is claimed is:

1. An adjustable vibration damper for a motor vehicle comprising:
    a cylinder containing a damping medium;
    a piston disposed within said cylinder for movement of said damping medium;
    a valve device connected to said cylinder for flow of said damping medium therethrough;
    said valve device having at least a first damping element and a second damping element;
    said first damping element including a first compression valve assembly and a first decompression valve assembly;
    said second damping element including a second compression valve assembly and a second decompression valve assembly;
    said first compression valve assembly having a first damping characteristic;
    said first decompression valve assembly having a second damping characteristic;
    said second compression valve assembly having a third damping characteristic;
    said second decompression valve assembly having a fourth damping characteristic; said first compression valve assembly including said first damping characteristic which is at a higher level than said second damping characteristic of said first decompression valve assembly;
    said second decompression valve assembly including said fourth damping characteristic which is at a higher level than said third damping characteristic of said second compression valve assembly; and
    switching means for selectively switching to at least one of said first and said second damping elements;
    said switching means including a four-way valve, said four-way valve for selectively switching to include both of said first and said second damping elements.

2. The adjustable vibration damper according to claim 1, wherein said first and said second damping elements are connected in parallel and said switching means is in series with said first and said second damping elements.

3. The adjustable vibration damper according to claim 2, wherein said switching means includes a first switch device and a second switch device respectively in series of said first damping element and said second damping element.

4. The adjustable vibration damper according to claim 2, wherein said switching means is also for selectively switching to include both of said first and said second damping elements.

5. The adjustable vibration damper according to claim 4, wherein said switching means includes a first switch device and a second switch device respectively in series of said first damping element and said second damping element.

6. The adjustable vibration damper according to claim 2, wherein
said switching means includes one of:
a first switch device and a second switch device respectively in series of said first damping element and said second damping element, and
a four-way valve;
said switching means is also for selectively switching to include both of said first damping element and said second damping element;
said valve device is located outside of said cylinder; and
said valve device is connected to said cylinder by damping medium lines.

7. The adjustable vibration damper according to claim 6, further including an independent damping element connected to said damping medium lines and said damping medium lines are connected to said cylinder at opposite sides of said piston.

8. The adjustable vibration damper according to claim 1 further including adjustment means for providing different forces is a compression stage than the forces created during a decompression stage.

9. An adjustable vibration damper for a motor vehicle comprising:
a cylinder containing a damping medium;
a piston disposed within said cylinder for movement of said damping medium;
a valve device connected to said cylinder for flow of said damping medium therethrough;
said valve device having at least a first damping element and a second damping element;
said first damping element including a first compression valve assembly and a first decompression valve assembly;
said second damping element including a second compression valve assembly and a second decompression valve assembly;
said first compression valve assembly having a first damping characteristic;
said first decompression valve assembly having a second damping characteristic;
said second compression valve assembly having a third damping characteristic;
said second decompression valve assembly having a fourth damping characteristic; said first compression valve assembly including said first damping characteristic which is at a higher level than said second damping characteristic of said first decompression valve assembly;
said second decompression valve assembly including said fourth damping characteristic which is at a higher level than said third damping characteristic of said second compression valve assembly; and
switching means for selectively switching to at least one of said first and said second damping elements;
wherein said first and said second damping elements are connected in series and said switching means is parallel with said first and said second damping elements.

10. The adjustable vibration damper according to claim 9, wherein aid switching means is also for selectively switching to isolate both of said first and second damping elements.

11. The adjustable vibration damper according to claim 9, wherein said switching means is also for selectively switching to by-pass both of said first and said second damping elements.

12. The adjustable vibration damper according to claim 11, wherein said switching means includes a first switch device and a second switch device which are in series with each other, said first switch device is parallel with said first damping element and said second switch device is parallel with said second damping element.

13. The adjustable vibration damper according to claim 11, wherein
said switching means includes one of:
a first switch device and a second switch device which are in series with each other, said first switch device being parallel with said first damping element and said second switch device being parallel with said second damping element, and
a four-way valve;
said switching means is also for selectively switching to include both of said first damping element and said second damping element;
said valve device is located outside of said cylinder;
said valve device is connected to said cylinder by damping medium lines;
said damping medium lines are connected to said cylinder at opposite sides of said piston; and
an independent damping element is connected to said damping medium lines.

14. The adjustable vibration damper according to claim 11, wherein
said switching means includes one of:
a first switch device and a second switch device which are in series with each other, said first switch device being parallel with said first damping element and said second switch device being parallel with said first second element, and
a four-way valve;
said switching means is also for selectively switching to include both of said first damping element and said second damping element;
said piston includes a first piston head and a second piston head; and
said first damping element and said second damping element of said valve device are respectively located in said first piston head and said second piston head.

15. The adjustable vibration damper according to claim 9, wherein said switching means includes a four-way valve and is also for selectively switching to include both of said first and said second damping elements.

16. The adjustable vibration damper according to claim 9, wherein said switching means is also for selectively switching to include both of said first and said second damping elements.

17. The adjustable vibration damper according to claim 16, wherein said switching means includes a first switch device and a second switch device which are in series with each other, said first switch device is parallel with said first damping element and said second switch device is parallel with said second damping element.

18. The adjustable vibration damper for a motor vehicle comprising:
a cylinder containing a damping medium;
a piston disposed within said cylinder for movement of said damping medium;
a valve device connected to said cylinder for flow of said damping medium therethrough;
said valve device having at least a first damping element and a second damping element;

said first damping element including a first compression valve assembly and a first decompression valve assembly;

said second damping element including a second compression valve assembly and a second decompression valve assembly;

said first compression valve assembly having a first damping characteristic;

said first decompression valve assembly having a second damping characteristic;

said second compression valve assembly having a third damping characteristic;

said second decompression valve assembly having a fourth damping characteristic; said first compression valve assembly including said first damping characteristic which is at a higher level than said second damping characteristic of said first decompression valve assembly;

said second decompression valve assembly including said fourth damping characteristic which is at a higher level than said third damping characteristic of said second compression valve assembly; and switching means for selectively switching to at least one of said first and said second damping elements;

wherein said valve device is located outside of said cylinder and is connected to said cylinder by damping medium lines.

19. An adjustable vibration damper for a motor vehicle comprising:

a cylinder containing a damping medium;

a piston disposed within said cylinder for movement of said damping medium;

a valve device connected to said cylinder for flow of said damping medium therethrough;

said valve device having at least a first damping element and a second damping element;

said first damping element including a first compression valve assembly and a first decompression valve assembly;

said second damping element including a second compression valve assembly and a second decompression valve assembly;

said first compression valve assembly having a first damping characteristic;

said first decompression valve assembly having a second damping characteristic;

said second compression valve assembly having a third damping characteristic;

said second decompression valve assembly having a fourth damping characteristic; said first compression valve assembly including said first damping characteristic which is at a higher level than said first damping characteristic of said first decompression valve assembly;

said second decompression valve assembly including said fourth damping characteristic which is at a higher level than said third damping characteristic of said second compression valve assembly; and switching means for selectively switching to at least one of said first and said second damping elements;

wherein said piston includes a first piston head and a second piston head and said first damping element and said second damping element of said valve device are respectively located in said first piston head and said second piston head.

20. An adjustable vibration damper for a motor vehicle comprising:

a cylinder containing a damping medium;

a piston disposed within said cylinder for movement of said damping medium;

a valve device connected to said cylinder for flow of said damping medium therethrough;

said valve device having at least a first damping element and a second damping element;

said first damping element including a first compression valve assembly and a first decompression valve assembly;

said second damping element including a second compression valve assembly and a second decompression valve assembly;

said first compression valve assembly having a first damping characteristic;

said first decompression valve assembly having a second damping characteristic;

said second compression valve assembly having a third damping characteristic;

said second decompression valve assembly having a fourth damping characteristic; said first compression valve assembly including said first damping characteristic which is at a higher level than said second damping characteristic of said first decompression valve assembly;

said second decompression valve assembly including said fourth damping characteristic which is at a higher level than said third damping characteristic of said second compression valve assembly; and switching means for selectively switching to at least one of said first and said second damping elements;

further including an independent damping element connected to damping medium lines connected to said cylinder at opposite sides of said piston.

* * * * *

UNITED STATES PATENT AND TRADEMARK OFFICE
CERTIFICATE OF CORRECTION

PATENT NO. : 4,986,393

DATED : January 22, 1991

INVENTOR(S) : Alfred PREUKSCHAT and Norbert ACKERMANN

It is certified that error appears in the above-identified patent and that said Letters Patent is hereby corrected as shown below:

On the title page where the Attorney, Agent or Firm is indicated, after 'Ljungman', insert --& Associates--.

In column 3, line 2, after 'which', insert --one--.

In Claim 10, line 2, after 'wherein', delete "aid" and insert --said--.

In Claim 19, line 26, delete the first instance of the word "first", and insert --second-- in its place.

Signed and Sealed this

Eleventh Day of August, 1992

Attest:

DOUGLAS B. COMER

Attesting Officer    Acting Commissioner of Patents and Trademarks

UNITED STATES PATENT AND TRADEMARK OFFICE
CERTIFICATE OF CORRECTION

PATENT NO. : 4,986,393

DATED : January 22, 1991

INVENTOR(S) : Alfred PREUKSCHAT and Norbert ACKERMANN

It is certified that error appears in the above-identified patent and that said Letters Patent is hereby corrected as shown below:

Column 11, line 22, Claim 8, after 'forces', delete "is" and insert --in--.

Column 12, line 33, Claim 14, after 'said', delete "first second" and insert --second damping--.

Signed and Sealed this

Twenty-third Day of November, 1993

Attest:

BRUCE LEHMAN

Attesting Officer      Commissioner of Patents and Trademarks